United States Patent [19]

Kubik

[11] Patent Number: 5,522,212
[45] Date of Patent: Jun. 4, 1996

[54] ROD EQUAL DISPLACEMENT CYLINDER IN A RAPID TRANSFER AND FEED SYSTEM

[76] Inventor: Philip A. Kubik, 1527 Lockridge, Bloomfield Hills, Mich. 48013

[21] Appl. No.: 360,639

[22] Filed: Dec. 21, 1994

[51] Int. Cl.⁶ .......................... F16D 31/02; F01B 25/26; F15B 11/00
[52] U.S. Cl. .......................... 60/414; 60/417; 60/428; 60/477; 91/1; 91/448; 91/519
[58] Field of Search .......................... 60/414, 417, 428, 60/429, 477; 91/1, 19, 24, 519, 448

[56] References Cited

U.S. PATENT DOCUMENTS

| | | | |
|---|---|---|---|
| 2,940,263 | 6/1960 | Cudnohufsky | 91/448 X |
| 2,963,865 | 12/1960 | Thomas | 60/417 |
| 3,653,208 | 4/1972 | Kubik . | |
| 3,951,042 | 4/1976 | Weiss | 60/428 X |
| 4,669,266 | 6/1987 | Kubik . | |
| 4,730,543 | 3/1988 | Holmes | 91/448 |
| 4,738,101 | 4/1988 | Kubik | 60/413 |
| 4,833,971 | 5/1989 | Kubik | 91/519 X |
| 5,048,292 | 9/1991 | Kubik | 91/519 X |

*Primary Examiner*—John E. Ryznic
*Attorney, Agent, or Firm*—Basile and Hanlon

[57] ABSTRACT

A single rod three chamber fluid cylinder is driven in an initial rapid advance forward stroke by a main pump, pumping fluid through a proportional directional control valve to act against a first equal area at the head end of the piston. Fluid expelled from a second equal area at the rod side of the piston is returned to the reservoir through a proportional directional control valve which is in a first position while a two position valve is in its first position allowing an accumulator to fill a third chamber exposed to a third area of the head side. When shifting to the feed stroke, the two position valve switches to its second position disconnecting the accumulator to the third area and connecting the main pump to the third area while also connected to the first equal area. Upon the return stroke of the piston, the fluid from the first equal area is returned to the sump and the fluid from the third area is routed to the accumulator.

7 Claims, 2 Drawing Sheets

| SOLENOID CHART | | | | |
|---|---|---|---|---|
| FUNCTION | 16 | 18 | 82 | |
| RAPID ADVANCE | + | − | + | A |
| FEED | + | − | − | B |
| RAPID RETURN | − | + | + | C |
| NEUTRAL | − | − | − | D |
FIG-2
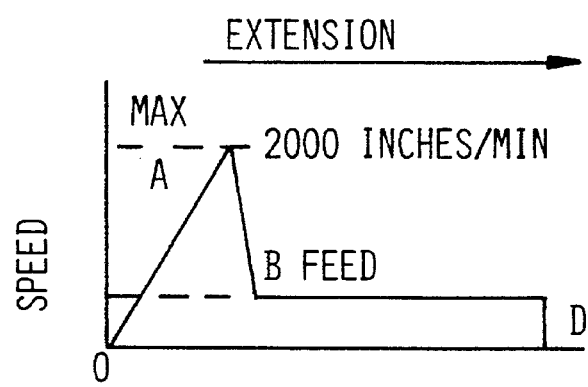
FIG-3
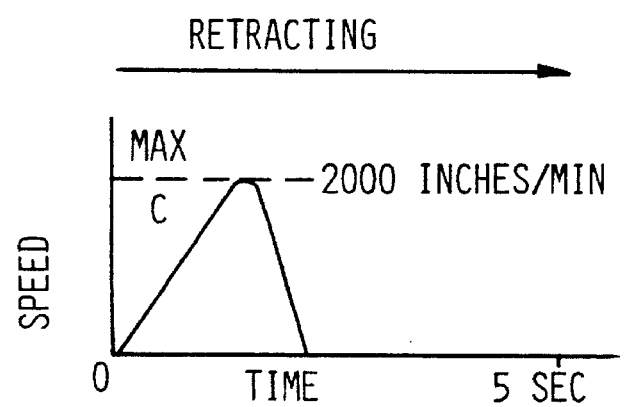
FIG-4

ROD EQUAL DISPLACEMENT CYLINDER IN A RAPID TRANSFER AND FEED SYSTEM

FIELD OF THE INVENTION

The present invention relates to a fluid system for controlling the movement of a single rod equal displacement fluid cylinder and particularly for using a proportional directional control valve.

BACKGROUND OF THE INVENTION

Heretofore fluid systems have been employed for controlling the rate of movement of hydraulic motors and, in particular, systems which have a single rod piston that has equal pressure responsive areas. An example of such a cylinder and system for operating the cylinder is disclosed in my U.S. Pat. No. 4,738,101 issued Apr. 19, 1988. There are a variety of applications when it is desirable to have a piston with only one piston rod.

A common requirement in many hydraulic systems is that the piston of a reciprocatory fluid motor is driven at a relatively high speed up to a certain point in its forward stroke, and then is driven through the remainder of its forward stroke at a relatively low speed under a relatively high applied pressure. A known system for accomplishing this result employs a proportional directional control valve and unequal displacement single rod ended cylinder.

The single rod three chamber cylinder referred to above in my patent includes two chambers to which equal area piston surfaces are exposed at the rod end side and the head end side of the piston. A third chamber hydraulically isolated from the first two chambers is exposed to a third area on the piston which faces the head end side of the piston. This particular type of cylinder is well adapted to a rapid traverse, low speed feed application in that rapid traverse in either direction is possible by utilizing the first two chambers, and the pressure applied during the feed portion of the forward stroke may be augmented by supplying fluid under pressure to act against the third area. There is no known method of using a proportional directional control valve in a feed system to drive a three chambered cylinder as described above.

SUMMARY OF THE INVENTION

The present invention is directed to a hydraulic system having a single rod piston of a three chamber cylinder controlled by a proportional directional control valve during the rapid advance, feed and rapid return cycles.

It is an object of the invention to drive the three chamber cylinder in rapid advance and rapid return with the speed of a small bore cylinder; and to drive the piston of the same cylinder in a low speed forward feed stroke with the stiffness and accuracy of a large bore cylinder. It is an additional object of the invention to be able to utilize a smaller proportional directional control valve which improves response and accuracy to direct the fluid flow as a result of having a smaller valve pressure responsive area of the cylinder during the rapid advance and rapid return functions.

In accordance with the present invention the two equal area chambers of a single piston rod three chamber cylinder are connected via a proportional directional control valve to the outlet of a main system pump and a sump. The proportional directional control valve is a conventional variable position valve which in its centered position blocks fluid to the chambers of the cylinder.

The chamber to which the third piston area of the cylinder is exposed may be connected via a two position valve to a low pressure make up system such as an accumulator. The two position valve functions to connect the third area chamber of the cylinder to the make up system when the piston is being driven in either rapid advance or rapid return.

The two position valve also functions to connect the third area chamber of the cylinder to the head end side equal area of the piston during the forward feed stroke. With this latter connection, a portion of the fluid flows from the proportional directional control valve through a branch conduit to the third area of the cylinder. The remaining portion of the fluid flows through the proportional directional control valve directly to the head end equal area side of the piston so that the piston is driven in feeding movement. During the rapid advance stroke, the third chamber of the piston is prefilled by the discharge of fluid under low pressure from the make up system into the third chamber, and this fluid is discharged from the third chamber back into the make up system during the rapid return stroke. In this manner only during the feed stroke, is pressure applied against the full head area of the cylinder.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWING

FIG. 2 is a table setting forth the program controlling actuator of the various valves operating solenoids of the system of FIG. 1;

FIG. 3 is a graph illustrating the piston rod speed vs. time during the extension of the cylinder illustrated in FIG. 1; and FIG. 4 is a graph illustrating the piston rod speed vs. time during the retracting of the cylinder illustrated in FIG. 1.

DESCRIPTION OF THE PREFERRED EMBODIMENT

Figure 1:
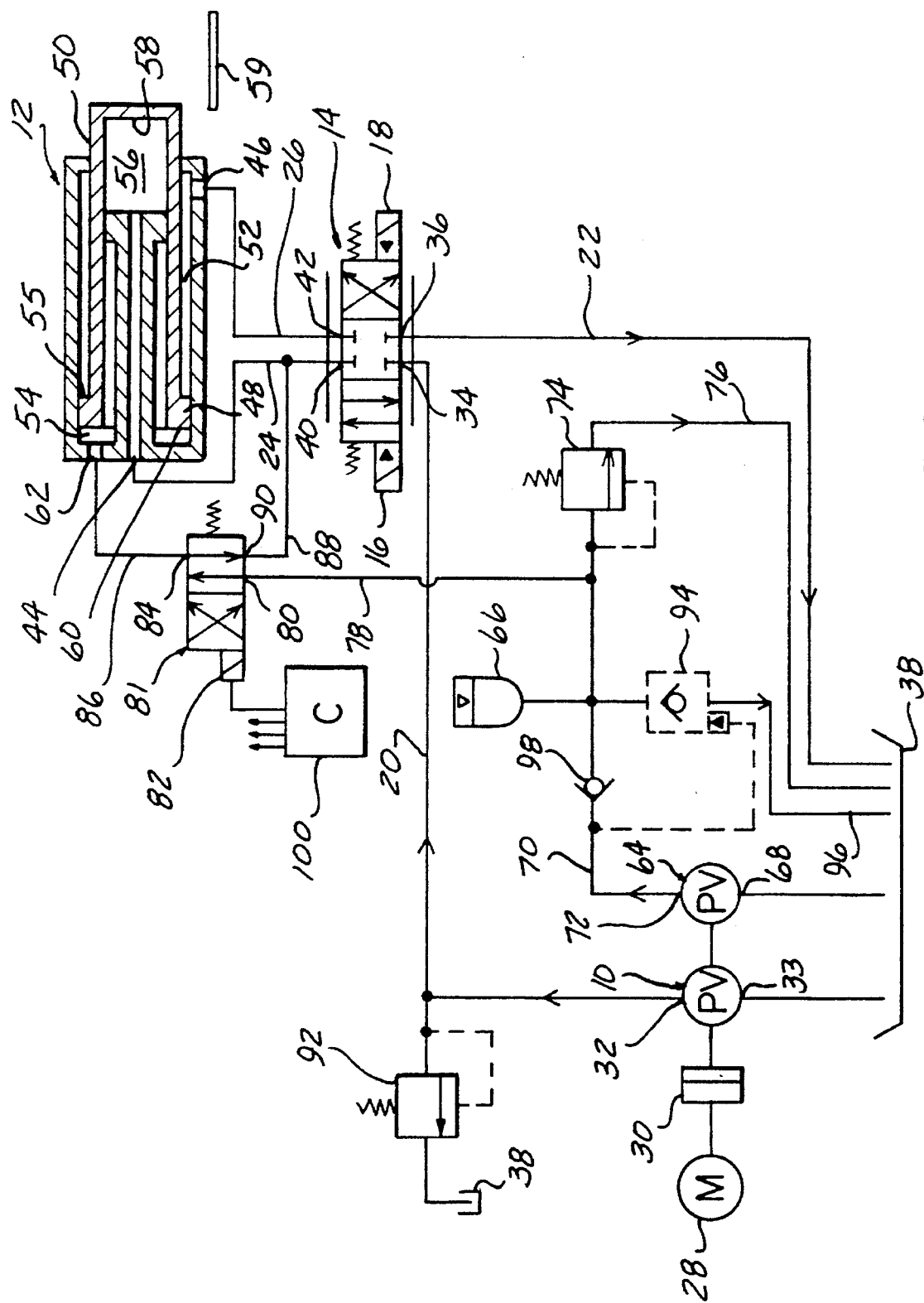
FIG. 1 is a schematic illustration of the present invention in the form of a fluid system having a single rod equal displacement fluid cylinder.

Referring now to the drawing and in particular to FIG. 1, there is illustrated a main circuit comprising a main variable displacement pump 10 connected in an open loop fashion by conduits to a single piston fluid cylinder 12. Incorporated in the main circuit is a conventional proportional directional control valve 14 (hereafter referred to as a proportional control valve) having solenoids 16 and 18 which operate the proportional control valve 14 in a conventional manner. Specifically, the proportional control valve 14 is adapted to variably connect conduits 20 and 22 selectively to the conduits 24 and 26 or to be positioned as shown closed/center to prevent communication between the conduits 20 and 22, with 24 and 26. The pump 10 is a variable displacement pump whose displacement may be controlled in a known manner. While a variable displacement pump 10 is illustrated, a fixed displacement pump may also be used. A prime mover, such as an electric motor schematically illustrated at 28 is mechanically connected through a suitable coupling device 30 to the drive shaft of the pump 10.

The main system pump 10 has an outlet 32 connected via conduit 20 to a pressure port 34 of the proportional control valve 14 and has an inlet side 33 connected to a sump or reservoir 38. The return port 36 of valve 14 is connected via conduit 22 to sump 38. When the proportional control valve 14 is in its normal centered position, (neither of solenoids 16 or 18 being energized), the ports 34 and 36 are blocked and allow no flow therethrough. The control ports 40 and 42 are isolated from the pressure and return ports 34 and 36 of proportional control valve 14 when the valve is in its illustrated centered position.

Port 40 is connected via a conduit 24 to the head end port 44 of cylinder 12 and the other control port 42 is connected via conduit 26 to the rod end port 46 of the cylinder 12. Cylinder 12 is of a known construction and is explained in more detail and may be had by reference to U.S. Pat. Nos. 4,751,818 and 5,048,292 which are incorporated here by reference. The cylinder 12 is shown schematically having a piston 48 slidably received within the cylinder with a single piston rod 50 projecting from the rod end of cylinder 12. Piston 48 divides the interior of the cylinder 12 into a rod end chamber 52 and a third chamber 54. The piston 48 and the cylinder 12 are constructed as to define within the cylinder 12 a second head end chamber 56 which is hydraulically isolated within the cylinder from chambers 52 and 54. An area indicated at 58 at the head end side of the piston is exposed to fluid pressure within second head end chamber 56, and this area is equal to the area 55 of the piston exposed to rod end chamber 52. These two areas are referred to as "equal areas" hereinafter while the area 60 of piston 48 exposed to chamber 54 is hereinafter referred to as the third area. The cylinder 12 is constructed so that equal areas 58 and 55 are individually a smaller proportion than the third area 60. The ratio of one equal area to the third area can vary per specific bore size and application of the cylinder 12. The equal area 58 plus the unequal area 60 equals the total area defined by the bore size of the cylinder. The cylinder is provided with rod and head end ports 46, 44 respectively communicating with chambers 52 and 56, and a third port 62 in communication with chamber 54.

A second pump 64 (which may be either a fixed or variable displacement pump) is included in the system to function as a low pressure fluid source operable to supply an accumulator 66 via conduit 70. The inlet side 68 of pump 64 is open to sump 38 and the outlet side 72 of pump 64 fills the accumulator 66. Once the accumulator 66 is filled, a bleed down valve 94 may be used to empty the oil from the accumulator back to the sump 38 through conduit 96 when the system is off-line. A branch conduit 78 from the accumulator is connected to a port 80 of a two position valve 81. A second port 84 of valve 81 is connected by a conduit 86 to the third chamber port 62 of the cylinder 12. A branch conduit 88 from the proportional control valve 14 connects to a third port 90 of the valve 81. Valve 81 functions essentially as a two-way valve to selectively connect its port 84 leading to port 62 of the third chamber 54, either to port 80 and to the accumulator 66 or to port 90 and to the main pump 10 through the proportional control valve 14. The valve 81 is shown in its normal position in FIG. 1. In this position, port 90 is connected to port 84 to connect the main pump 10 to the third chamber 54 of the cylinder 12 when solenoid 16 is energized which occurs during the feed stroke "B". Upon energizing solenoid 82 of valve 81, port 80 is connected to port 84 to connect the accumulator 66 to the third chamber 54 of the cylinder 12 during the rapid advance and rapid return strokes.

A control unit 100 electrically connects all the solenoids and systematically controls the energization of the various valves. To avoid confusion by incorporating extra connecting conduits, FIG. 1 shows the control unit 100 only connected to a solenoid 82, although control unit 100 is actually connected to all the solenoids.

Overload relief valves 92 and 74 are operatively connected as overload relief valves respectively, for the main pump 10, auxiliary pump 64 and, accumulator 66. If an overload condition occurs, the relief valves 92 and 74 vent fluid to the sump 38. In the example of a system, relief valve 92 may be set at 2000 psi when relief valve 74 is set at 250 psi. While the use of an accumulator 66 is preferred, the inventive system will function with only the pump 64 supply line pressure fluid to the third chamber 54.

Many conventional components, such as filters, oil coolers, pressure gages, etc. have not been shown in FIG. 1 in that these components are conventional and do not directly influence the circuit operation. The circuit of FIG. 1 does, however, include a check valve 98 in conduit 70 oriented to block fluid flow from the accumulator 66 back to the feed pump 64.

OPERATION

A conventional position sensor 59 determines the position of the end of rod 50 and that position information is used in the conventional manner to provide an operating signal to the proportional directional control valve 14.

The circuit of FIG. 1 is usable in different applications, such as drilling or boring applications. The circuit offers four functional operations to operate a tool. A first function, a rapid advance function of the piston stroke is employed to move the tool from its retractive position into near contact with a workpiece. A feed function provides feed action to the tool to accomplish the next portion of the working stroke of the piston such as the actual drilling or boring. A rapid return function of the piston stroke is employed to return the tool back to its retracted position. And finally, there is a neutral or rest position, as shown in FIG. 1, wherein there is no fluid transfer to the cylinder.

The neutral function as indicated in the chart of FIG. 2 and shown in the circuit of FIG. 1 indicates that all of the valve operating solenoids are in their normal deenergized state. A negative sign in the chart of FIG. 2 indicates a deenergized state of the solenoid. A positive sign in the chart indicates an energized state of the solenoid. In the neutral position, rod 50 is retracted, ready to be extended from the cylinder 12.

To cause rod 50 to be driven to the right in a rapid advanced movement, the control unit 100 is actuated, either manually or automatically, into a rapid advance state in which as indicated by the table of FIG. 2, solenoids 16 and 82 are energized and pumps 10 and 64 and accumulator 66 are delivering fluid under pressure. Solenoid 18 remains deenergized.

Energization of solenoid 16 will variably shift valve 14 to connect port 34 to port 40 and port 36 to port 42 as necessary to control fluid flow in the conventional manner. With these fluid connections established, main pump 10 supplies fluid under pressure through ports 34 and 40 of valve 14 to conduit 24 and thence to the head end port 44 of cylinder 12 to act against the head end equal area 58 of rod 50. The rod end chamber 52 of cylinder 12 will be connected via port 46, conduit 26, ports 42 and 36 of the valve 14 and return conduit 22 to the sump 38. The volume of fluid pumped by main pump 10 into head end chamber 56 of cylinder 12 against the head end equal area 58 of rod 50 is equal to the volume of fluid expelled by the rod end equal area 55 from chamber 52 and returned to the sump 38.

Energization of solenoid 82 shifts valve 81 to connect port 80 to port 84. This connects accumulator 66 via conduit 78 and valve 81 to conduit 86 which leads to the third chamber 54 of cylinder 12. Fluid from accumulator 66 can thus flow at low pressure into third chamber 54 to maintain the chamber filled as piston 48 moves to the right in response to pressure fluid applied from main pump 10. During the rapid advance function, the accumulator 66 system functions to prefill the third area 54 of the cylinder until that portion of the cylinder is needed during the feed function while exerting little force on the piston 48. Therefore, the accumulator system only requires a low pressure from accumulator 66.

The high pressure fluid acts only on the head end area 58 as fluid flows into chamber 56. As a result, cylinder 12 functions as though it is a smaller cylinder having a bore size equal to head end area 58. A smaller cylinder offers the advantages of high speed to move piston 48 rapidly to the right as viewed in FIG. 1. In addition, as discussed further below, a smaller cylinder requires a smaller proportional directional control valve 14 be used in the circuit than is used with a larger cylinder, because the volume of fluid to be transmitted through the valve 14 is proportionally smaller with the smaller cylinder.

The completion of the rapid advance portion of the working stroke of rod 50 will be sensed by position sensor 59 and a signal from control unit 100 which then shifts the piston rod 50 from its rapid advance state to its feed state. As indicated in FIG. 2, when control unit 100 is in its feed state, only solenoid 16 is energized while solenoids 18 and 82 are deenergized.

With solenoid 16 energized valve 14 is positioned as in the rapid advance function, where there is control variable connection of the valve 14 connecting port 34 to port 40 and port 36 to port 42. Main pump 10 supplies fluid under pressure through ports 34 and 40 of valve 14 to conduit 24. With solenoid 82 deenergized, valve 81 will return to its position as shown in FIG. 1, disconnecting the accumulator 66 from the third chamber 54 of the cylinder 12. As valve 81 isolates the accumulator from the third chamber 54 of cylinder 12, it also opens port 90 to port 84 of valve 81 giving access to the fluid from the main pump to the third chamber 54 via the branch conduit 88 flowing through ports 90 to 84 and through conduit 86 to port 62. Therefore, a portion of the flow through the directional control valve 14 will flow to the equal chamber 56 and the remaining portion of the will fluid will flow into the third chamber 54 of cylinder 12 to feed the piston rod 50 as shown in FIG. 3.

For a given displacement of rod 50 during the feed function, the volume of fluid applied against the head end of piston 48 is substantially greater than the volume of fluid which is expelled by this given displacement from rod end chamber 52. During this function, fluid expelled from chamber 52 flows through conduit 26 through ports 42 and 36 of valve 14, and through conduit 22 to sump 38.

This configuration of the circuit opens the full area of cylinder 12 to the full head end area of the cylinder. That is, the third area 60 and the equal area 58, which when totalled, makes the full bore area of the cylinder 12. As a result, the cylinder rod 50 moves slower in a feed mode. With the bulk modulus of the fluid from the main pump 10 being constant and acting over a larger pressure area of cylinder 12 that is utilized by funneling fluid into both the equal and third chambers 56 and 54, cylinder 12 operates at a lower pressure having less oil compressibility which therefore provides a stiffer system than with a smaller cylinder.

The following examples illustrate the advantage of the circuitry of the present invention. If a 3¼ inch bore cylinder is used having a total area of 8.303 in$^2$, and if the cylinder is configured so that the equal areas 55 and 58 have an area of 1.767 in$^2$ and the third area 60 has a total area of 6.536 in$^2$, during the rapid advance function of the circuit wherein fluid from the main pump flows only into the equal area 58 of the cylinder; the rapid advance function in the cylinder will have the characteristics of a 1½ bore standard cylinder which has a 1,767 sq. inch area. The ratio between the third area 60 and the equal area 58 is 3.70:1. Since the equal area 58 is less than ⅓ of the third area, the circuit requires a smaller and more accurate directional proportional control valve 14 than if the full area of a standard 3¼ inch bore cylinder was used.

During the feed function of the operation where the proportional valve fills both head end chambers of the cylinder area comprising third area 60 and the equal area 58, the cylinder has the "stiffness" of a 3¼ inch diameter standard cylinder and greater feed accuracy due to the use of a smaller proportional valve. For a given force there is a larger surface area to work against and therefore the circuit operates at a lower pressure. With a lower pressure there is less fluid compressibility which results in a stiffer system. As a result, using the cylinder 12 with the circuit as described in the invention, one cylinder has the characteristics of two different sized cylinders for different functions—a small bored cylinder when the function requires high velocity and a large bore cylinder when the function requires a very low speed accuracy, position accuracy and stiffer system.

When the control unit is subsequently actuated to return piston 48 to its original position, the control unit energizes solenoids 18 and 82 and deenergized solenoid 16 for the rapid return function.

With solenoid 18 energized, valve 14 is shifted to variably connect its cross connections with the valve ports to connect port 42 with 34 and port 40 with port 36. Port 34 is thus connected to port 42 and port 36 is connected to port 40 so that main pump 10 supplies fluid under pressure to rod end chamber 52 and fluid is discharged from head end chamber 56 to the sump 38. As indicated in FIGS. 2 and 4 during the rapid return phase of operation, solenoid 82 is energized thereby connecting conduit 86 to conduit 78 which leads to accumulator 66. As rod 50 moves to its left during the rapid return stroke, the third area 60 of the piston 48 expels fluid from the third chamber 54 of cylinder 12, and all of this fluid is connected via conduit 86, valve 81 and conduit 78 to accumulator 66 to recharge the accumulator. Pump 64 will maintain the accumulator at the desired pressure.

During the initial movement of the piston rod 50, the velocity of piston rod 50 during a forward stroke shows that the velocity builds up initially to a maximum velocity which is maintained and then reduced until the piston rod 50 is at a displacement from its rest position at which the feed portion of the forward stroke is to commence. As is known in the art, acceleration and deceleration of the piston rod 50 at the beginning and end of the rapid advance portion of its stroke is accomplished by programming the proportional control valve under the control of control unit 100 to commence the deceleration portion of the rapid advance phase at a predetermined location.

Proportional control valve 14 is capable of partially opening the valve passages to establish a selectively adjusted flow rate to and from the equal area chamber and the third area chambers of cylinder 12. The proportional control valve may be controlled by appropriate programming of controller 100 which receives position information from a sensor 59.

It should be noted that during the initial high speed extension of the piston rod 50, the third pressure chamber 54 is at a low pressure with fluid from the accumulator 66 functioning as a make up system with the pressure just high enough to transfer fluid into the chamber 54 but not high enough to exert any appreciable force on the third area 60.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hydraulic feed circuit for selectively driving a single rod piston operatively disposed in a hydraulic cylinder of the type having three chambers, said piston having equal pressure responsive areas on its rod side and on its head end side respectively exposed in first and second chambers of said cylinder, and a third area on its head side exposed in a third chamber of said cylinder;

said circuit comprising a first source of fluid pressure;

a proportional control valve for selectively communicating fluid from said first source to said first and second chambers to selectively expand and retract said cylinder;

a second source of fluid pressure, said second source being at a substantially lower pressure than said first source;

valve means operable in a first position to connect said second source of fluid to said third chamber during an initial rapid extension of said cylinder when said proportional control valve communicates fluid from said second source of fluid pressure to said first chamber to rapidly expand said cylinder; and said valve means being operable to connect said first source of fluid pressure downstream of said proportional control valve to said third chamber when said proportional control valve communicates the source of fluid pressure to said second chamber for expanding said cylinder during a second slower expansion of said cylinder.

2. The hydraulic feed circuit defined in claim 1 wherein said valve means is operable to connect said third chamber to said low pressure source when said proportional control valve communicates said first source of pressure to said first chamber for retracting said cylinder.

3. The hydraulic feed circuit defined in claim 1 wherein said second source of pressure is a fluid accumulator.

4. A hydraulic feed circuit for selectively driving a single rod piston operatively disposed in a hydraulic cylinder having three chambers, said piston having equal areas on its rod side and its head end side respectively exposed in first and second chambers of said cylinder, and a third area on its head end side exposed in the third chamber of said cylinder;

said circuit comprising a main pump for pumping fluid through said circuit and connected to said first and second chambers via a proportional control valve and said main pump connected to said third chamber via the proportional control valve and a two position valve, an accumulator communicating with and disposed upstream of the two position valve and selectively maintaining fluid in the third chamber, said two position valve operable in a first position to connect the accumulator to the third chamber and in a second position to connect the main pump to the third chamber via the proportional control valve, said main pump driving said piston in a forward traverse stroke.

5. The invention defined in claim 4 wherein the accumulator is isolated from the third area when the main pump is connected via said proportional control valve to the third chamber so that a portion of the fluid from the main pump is diverted to the third chamber while remaining portion flows to the second chamber.

6. The invention defined in claim 4 wherein said main pump drives said piston in a return traverse stroke when said proportional control valve is in a second position.

7. The invention defined in claim 4 further comprises control means for controlling said proportional control valve and said two position valve, said control means being operable to position said two position valve in its first position when said control means positions said proportional control valve; and operable to position said two position valve in its second position when said control means repositions said proportional control valve.

* * * * *

UNITED STATES PATENT AND TRADEMARK OFFICE
CERTIFICATE OF CORRECTION

PATENT NO. : 5,522,212                          Page 1 of 3
DATED     : June 4, 1996
INVENTOR(S): Philip A. Kubik It is certified that error appears in the above-identified patent and that said Letters Patent is hereby corrected as shown below:

In the drawing, reference number 53 is added to Figure 1.

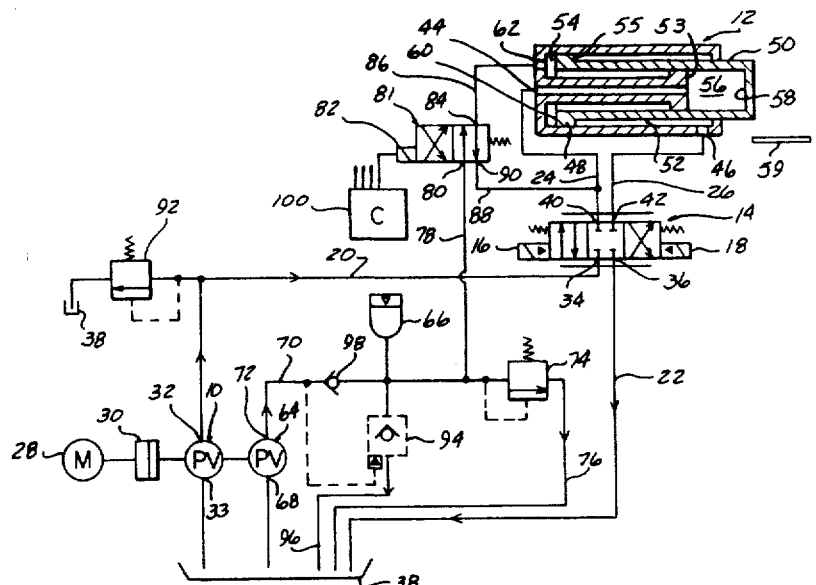

FIG-1

UNITED STATES PATENT AND TRADEMARK OFFICE
CERTIFICATE OF CORRECTION

PATENT NO. : 5,522,212
DATED : June 4, 1996
INVENTOR(S) : Philip A. Kubik

It is certified that error appears in the above-indentified patent and that said Letters Patent is hereby corrected as shown below:

On the Title Page, in the Title Block, insert --Single-- before "Rod".

On the Title Page, in the Inventor Block, delete "Lockridge" and insert --Lochridge--.

On the Title Page, in the Inventor Block, delete "48013" and insert --48302--.

In column 2, line 52, delete "piston" and insert --rod equal displacement--.

In column 3, line 21, delete "48" and insert --53--.

In column 3, line 25, insert --53-- after "piston".

In column 3, line 27, insert --48-- after "piston".

In column 5, line 30, delete "control" and insert --a controlled--.

In column 5, line 44, delete the first occurrence of "will".

In column 6, line 44, delete "Pump 64" and insert --Relief valve 74--.

In column 7, line 35, delete "second" and insert --first--.

UNITED STATES PATENT AND TRADEMARK OFFICE
CERTIFICATE OF CORRECTION

PATENT NO. : 5,522,212
DATED : June 4, 1996
INVENTOR(S) : Philip A. Kubik

It is certified that error appears in the above-indentified patent and that said Letters Patent is hereby corrected as shown below:

In column 7, line 41, delete "second" and insert --first--.

In column 8, line 2, delete "first", second occurrence and insert --second--.

In column 8, line 32, delete "second" and insert --first--.

Signed and Sealed this

Nineteenth Day of May, 1998

Attest:

BRUCE LEHMAN

*Attesting Officer*        *Commissioner of Patents and Trademarks*